Patented Apr. 20, 1948

2,440,048

UNITED STATES PATENT OFFICE 2,440,048

FLUORESCENT SILICATE GLASSES AND METHODS FOR MAKING SAME

Harrison P. Hood, Corning, N. Y., assignor to Corning Glass Works, Corning, N. Y., a corporation of New York No Drawing. Application June 17, 1944, Serial No. 540,793

5 Claims. (Cl. 252—301.4)

This invention relates to reduced glasses or glasses which are melted under reducing conditions through the use of reducing agents in their batches. Ordinary reducing agents such as carbon and carbonaceous materials are very effective and, in glasses containing easily reducible materials such as cupric or cuprous oxides, and other glass-coloring elements or oxides, a very exact control of the amount of reducing agent is necessary in order to avoid over- or under-reduction. Exact control is difficult because many glasses are quite sensitive to small changes in amount of such reducing agents.

The primary object of this invention is to provide a new reducing agent the action of which is milder and can be more easily controlled than that of prior reducing agents.

Another object is to provide a method of reducing glasses to a definite partial state of reduction.

Another object is to provide a method for partially or wholly reducing colored glasses.

Another object is to provide a method for reducing a glass containing a compound of copper or other glass coloring element to a definite partial state of reduction.

Another object is to increase the fluorescence of copper and other fluorescing elements in glass.

Another object is to obtain the maximum fluorescent efficiency from a glass containing copper as the sole fluorescing material.

Another object is to improve the sensitivity and color contrast of photosensitive copper-containing glasses.

The elements or their oxides which are commonly employed to color glass such as vanadium, chromium, manganese, iron, copper, silver, gold, uranium, and selenium are capable of producing various colorations depending upon the state of reduction of the glass. For example, copper oxide may produce several effects in glass. In oxidized glasses, it produces a blue or blue-green color. When the glass is partially reduced, it becomes practically colorless. Further reduction produces a red color. Copper-containing silicate glasses which are reduced to the colorless state fluoresce when the glass is irradiated with ultraviolet radiations. Certain colorless copper-containing glasses are also photosensitive, that is, they are so affected by wave lengths shorter than about 4000 Angstroms that subsequent heating causes coloration only of their irradiated portions. A mild or easily controlled reducing agent is oftentimes necessary and desirable for the reduction of colored glasses.

I have discovered that ammonium chloride acts as a mild reducing agent in glasses which contain small but substantial amounts of vanadium, chromium, manganese, iron, copper, silver, gold, uranium, or selenium, by means of whch the exact degree of reduction can be controlled more easily than has heretofore been possible. The amount of ammonium chloride required for a given reduction is many times the amount of carbon which is required for the same effect. Among the many beneficial results flowing from my invention I have found, for example, that when ammonium chloride is used as the sole reducing agent in a copper-containing glass, the maximum fluorescence of the copper in the glass is more readily achieved and slight variations in the amount of reducing agent have a smaller effect on the fluorescence than is the case when carbon is employed as reducing agent. Best results are obtained when the copper content of the batch is equivalent to at least 0.1% CuO in the finished glass.

For example, two series of soda lime glasses were melted in which one series contained as reducing agent varying amounts of carbon and the other series contained as reducing agent varying amounts of ammonium chloride, the batches being otherwise identical and containing each about 17% $Cu_2Cl_2$. The relative amounts of fluorescence produced by the various glasses as compared to that produced by a standard calcium tungstate powder when irradiated by ultraviolet radiations were determined as follows:

The individual glasses were pulverized and their powders individually were irradiated by a low pressure mercury arc lamp. The resulting fluorescent light, if any, was permitted to impinge on a photoelectric cell after passing through suitable filters to permit only selected wave lengths to strike the cell, which was shielded from all extraneous light. The electrical impulses thus generated by the photoelectric cell were registered by a galvanometer connected thereto. For calibrating the apparatus a strongly fluorescent material, such as powdered calcium tungstate, was irradiated and the intensity of the irradiating light was adjusted by rheostat to give a convenient galvanometer reading, in the present instance a reading of 40. The same intensity of irradiation was then employed for testing the powdered glass samples, the galvanometer readings being taken as the arbitrary relative measure of their fluorescence.

The following table shows the percentage of reducing agent in the batches of the various glasses and their fluorescence values in terms of galvanometer readings obtained by the above described method:

| Batch No. | Reducing Agent | Fluorescent Value |
|---|---|---|
| 1 | .062% carbon | 31½ |
| 2 | .064% carbon | 38 |
| 3 | .065% carbon | 36 |
| 4 | .068% carbon | 28 |
| 5 | .21% NH$_4$Cl | 31½ |
| 6 | .41% NH$_4$Cl | 35 |
| 7 | .50% NH$_4$Cl | 38 |
| 8 | .66% NH$_4$Cl | 37 |

Batch No. 2 contained an optimum content of carbon and batch No. 7 contained an optimum content of ammonium chloride, the fluorescence in each case being at a maximum. Batches 1, 5 and 6 contained an insufficient amount of reducing agent and were under-reduced as shown by the fluorescence which is less than maximum. Batches 4 and 8, on the contrary, were over-reduced and here also the fluorescence is less than the maximum.

It will be noted that in general the percentage of carbon is smaller than the percentage of ammonium chloride required for the same effect. The percentage of carbon is more critical than the percentage of ammonium chloride and a slight change from the optimum carbon content causes a sudden marked depreciation in the fluorescence. The same change from the optimum ammonium chloride content has no effect on the fluorescence. As a result of this, a small excess or deficiency in the ammonium chloride has little if any effect and the state of reduction is therefore more readily controlled than when carbon is used as the reducing agent.

When ammonium chloride is employed as the reducing agent in photosensitive copper containing glasses, they are more sensitive to ultraviolet radiations and a greater degree of contrast is obtained in the tonal values of the image which is developed in the irradiated glass by heat. The specific use of ammonium chloride as a reducing agent in such photosensitive glasses is described in patent applications Serial Numbers 513,444 and 513,445 filed on December 8, 1943, by S. D. Stookey and assigned to the assignee of this application.

The following batches in parts by weight are examples of compositions containing copper oxide and ammonium chloride in accordance with my invention:

Table I

|  | A | B | C |
|---|---|---|---|
| Sand | 100 | 100 | 100 |
| Na$_2$CO$_3$ | 12 | 42 | 22 |
| K$_2$CO$_3$ | 38 |  | 10 |
| Al(OH)$_3$ | 2 | 3.2 | 15 |
| CaCO$_3$ | 12.5 | 21 |  |
| Cu$_2$Cl$_2$ | 1.1 |  |  |
| NH$_4$Cl | 0.8 | 2.4 | 1.8 |
| CuO |  | 0.15 | 0.15 |
| SnO$_2$ |  | 0.35 | 0.35 |
| CeO$_2$ |  | 0.05 | 0.05 |
| BaCO$_3$ |  |  | 16 |
| Na$_2$SiF$_6$ |  |  | 5 |

The above batches, when melted, will produce the following glasses as calculated in percent by weight:

Table II

|  | A | B | C |
|---|---|---|---|
|  | Per cent | Per cent | Per cent |
| SiO$_2$ | 72.4 | 72.0 | 70.5 |
| Na$_2$O+K$_2$O | 21.0 | 17.6 | 13.5 |
| Al$_2$O$_3$ | 1.0 | 1.5 | 7.0 |
| CaO | 5.0 | 8.5 |  |
| BaO |  |  | 8.6 |
| Cu$_2$O | .6 | .1 | .1 |
| SnO$_2$ |  | .2 | .2 |
| Ce$_2$O$_3$ |  | .04 | .04 |

Composition A is a glass having a high fluorescence when irradiated with ultraviolet radiations and is suitable for the manufacture of enclosures for fluorescent lamps. Composition B is a transparent photosensitive glass, and composition C is a photosensitive glass which becomes opal on being heated. Batches B and C required more NH$_4$Cl than batch A on account of the presence of the higher oxides of copper, tin and cerium. Due to the presence of NH$_4$Cl in the batch the copper in the resultant glass is believed to be present as Cu$_2$O. However, in the analysis of a glass containing copper in the cuprous form no suitable analytical method is available for its direct determination as Cu$_2$O and it usually is separated and weighed as metallic copper. By calculation it may be expressed as either Cu$_2$O or the equivalent amount of CuO. Accordingly the copper content of the glasses of this invention is stated in equivalent amounts of CuO although probably present in the glass as Cu$_2$O. The glass of composition A above has a copper content which is equivalent to about 0.6% Cu$_2$O as shown in Table II or 0.66% CuO, while the glass of composition C has a copper content equivalent to about 0.11% CuO. In the claims the copper contents are therefore expressed as the equivalent amounts of CuO. In addition to the above examples, other compositions may be employed containing one or more of the glass coloring elements vanadium, chromium, manganese, iron, copper, silver, gold, uranium and selenium.

It has not heretofore been known that ammonium chloride can act as a reducing agent in glass and in fact my researches show that ordinarily it has no such effect. I have found that it has a reducing action in those glasses containing a compound of one of the above named glass-coloring elements and it is believed that they act as catalysts in the early stages of the melt to cause partial decomposition of the ammonium radical to produce hydrogen. Other known glass coloring elements produce no appreciable color change nor other desirable effect when present in the glass with ammonium chloride and are not included within the scope of the present invention.

Practically any glass composition is suitable for use according to my invention and will be reduced by ammonium chloride provided it contains at least a small amount of the aforesaid glass-coloring elements, although relatively large amounts may be present if desired. The ammonium salts of anions having an oxidizing effect, such as the nitrate, sulfate and the like, are ineffective for my purpose. Preferably such anions and other materials having an oxidizing action, for example, oxides of polyvalent elements such as arsenic, antimony, sulfur, etc., should preferably be absent because their presence necessitates the use of larger amounts of ammonium chloride than would otherwise be necessary. If desired, the presence of excessive amounts of oxidizing materials may to some extent be compensated by the use of a small amount of carbon or equivalent reducing agent in addition to the ammonium chloride.

I claim:

1. A batch for a fluorescent glass which consists of approximately 60% sand, 7% $Na_2CO_3$, 23% $K_2CO_3$, 1% $Al(OH)_3$, 8% $CaCO_3$, .7% $Cu_2Cl_2$, and .5% $NH_4Cl$.

2. The glass corresponding to the batch of claim 1.

3. The method of making a colorless fluorescent silicate glass which comprises introducing into a batch containing a copper compound equivalent to about 0.11% to 0.66% CuO in the finished glass, about .8 to 2.4 parts of ammonium chloride per 100 parts of $SiO_2$, and melting the batch.

4. A batch for a colorless silicate glass which contains a compound of copper equivalent to 0.11% to 0.66% CuO in the finished glass and .8 to 2.4 parts of ammonium chloride per 100 parts of $SiO_2$.

5. The glass corresponding to the batch of claim 4.

HARRISON P. HOOD.

REFERENCES CITED

The following references are of record in the file of this patent:

UNITED STATES PATENTS

| Number | Name | Date |
|---|---|---|
| 288,056 | Higley | Nov. 6, 1883 |
| 1,482,389 | d'Adrian | Feb. 5, 1924 |
| 2,099,602 | Fischer | Nov. 16, 1937 |

FOREIGN PATENTS

| Number | Country | Date |
|---|---|---|
| 752,636 | France | Sept. 27, 1933 |

OTHER REFERENCES

Glass Industry, September 1935, page 273.